US008603208B2

(12) United States Patent
Ziegler

(10) Patent No.: US 8,603,208 B2
(45) Date of Patent: Dec. 10, 2013

(54) TUBE DEVICE FOR A MOTOR VEHICLE AIR FILTER SYSTEM AND RELATED METHOD OF ASSEMBLY

(75) Inventor: Ralf Ziegler, Benningen (DE)

(73) Assignee: Audi AG, Ingolstadt (DE)

( * ) Notice: Subject to any disclaimer, the term of this patent is extended or adjusted under 35 U.S.C. 154(b) by 515 days.

(21) Appl. No.: 12/552,631

(22) Filed: Sep. 2, 2009

(65) Prior Publication Data

US 2010/0065002 A1 Mar. 18, 2010

(30) Foreign Application Priority Data

Sep. 3, 2008 (DE) ......................... 10 2008 045 595

(51) Int. Cl.
*B01D 46/00* (2006.01)

(52) U.S. Cl.
USPC ............ 55/428; 55/385.3; 55/466; 123/198 E

(58) Field of Classification Search
USPC .............. 55/428, 431, 466, 385.3; 123/198 E
See application file for complete search history.

(56) References Cited

U.S. PATENT DOCUMENTS 3,796,026 A * 3/1974 Mugford ......................... 55/338
5,107,800 A 4/1992 Araki et al.
5,479,907 A * 1/1996 Walker, Jr. .................... 123/573
5,599,713 A * 2/1997 Sato ........................... 435/300.1
6,143,049 A * 11/2000 Gieseke et al. .............. 55/385.3
6,155,225 A 12/2000 Suzuki
6,309,436 B1 * 10/2001 Holch ............................. 55/337
7,186,282 B2 * 3/2007 Su .................................. 55/330
7,257,942 B2 * 8/2007 Schmeichel et al. ............ 60/283

FOREIGN PATENT DOCUMENTS

DE 19942503 A1 3/2001
DE 10354686 A1 6/2005
KR 1020060058273 A 5/2006

OTHER PUBLICATIONS

Chinese Patent Application No. 2009101710670 Second Office Action dated Nov. 7, 2012.

* cited by examiner

*Primary Examiner* — Robert Clemente
(74) *Attorney, Agent, or Firm* — Novak Druce Connolly Bove + Quigg LLP

(57) ABSTRACT

The invention relates to a motor vehicle air filter system with pipe elements for feed and discharge of an air flow, particularly for an internal combustion engine. To remove water which is filtered out of the air flow, under the bottom of the housing of the air filter a tube element is attached. Since this assembly region is poorly accessible, there is the risk that the tube element will be kinked or pinched during installation and thus water cannot properly drain out. In order to enable smooth and reliable assembly of the tube element, the tube element according to the invention is attached to the pipe element by means of carrier elements. In the assembly of the pipe element the tube element is automatically located at the proper position in the installation space. Here it is protected against kinking by its connection to the pipe element.

12 Claims, 2 Drawing Sheets

TUBE DEVICE FOR A MOTOR VEHICLE AIR FILTER SYSTEM AND RELATED METHOD OF ASSEMBLY

The invention relates to a motor vehicle air filter system, particularly for an internal combustion engine, with an air line and water drain hose for removing the moisture collected in the air filter. The invention also includes a method for assembly of the motor vehicle air filter system.

BACKGROUND OF THE INVENTION

Motor vehicle air filter systems are used to remove impurities such as sand particles and water from the air which is required by an internal combustion engine. The intaken air is routed by way of an inlet tube into the housing of an air filter where it first sheds larger particles and water droplets. The air which has been precleaned in this way is then intaken through a filter element and travels by way of an outlet tube to the internal combustion engine. Both the air filter housing and also the inlet and outlet tube consist of relatively stiff components in order to withstand the negative pressure generated within the air filter system by the suction action of the internal combustion engine.

The water which is formed in the filtration of air must be removed from the air filter housing against this negative pressure. For this purpose it is brought together in a collecting region on the bottom of the housing. In the collecting region there is a drain which, however, is closed by a valve to prevent air from flowing into the housing through the drain due to the negative pressure which prevails in the filter housing. With a rising water level in the collecting region, i.e., with increasing geodetic height of the water column located over the valve, the water pressure which acts on the valve of the drain rises until it finally equalizes the negative pressure and the valve is pushed open.

The water which is then running out is routed by way of a drain hose underneath the filter housing in the engine compartment into a region where it can freely drip out. It is also possible to arrange the valve on the exit end of the hose. This results in that the water is collected within the hose and thus a separate collecting region on the bottom of the housing can be dispensed with. The water collecting in the comparatively narrow tube also ensures that the water does not slosh as the motor vehicle is driving, by which splash water could be thrown onto the filter element of the air filter.

Instead of a valve for preventing the inflow of air through the drain hose, according to DE 199 42 503 A1 the drain hose is installed in the form of a loop, or meandering. In the resulting turns of the drain hose, according to the siphon principle there is always a minimum amount of water which is moved due to the negative pressure in the filter housing within the drain hose, but which prevents entry of air through the drain hose into the filter housing as in the case of the valve. However, this form of air sealing presupposes a relatively small cross section of the drain hose, since otherwise air bubbles could rise through the water column which has been displaced due to the negative pressure in the drain hose and for this reason the desired sealing function would not be achieved.

Since the drain hose is always attached to the bottom of the filter housing, in the production or repair of a motor vehicle the problem is that the drain of the air filter housing is only poorly accessible for a mechanic, since the air filter has already been installed in the engine compartment of the motor vehicle. Thus, there is the risk that the drain hose will be kinked or pinched between other components in assembly such that water can no longer drain out of the filter housing by way of the drain hose. Due to the unfavorable location of the connection for the drain hose, after assembly it is also difficult to check the proper position of the drain hose under the air filter.

Therefore, the object of this invention is to enable smooth assembly of a drain hose for the collected liquid for a motor vehicle air filter system and thus to ensure proper alignment of the hose.

SUMMARY OF THE INVENTION

According to the invention, thus a tube element for water drainage is attached by way of at least one carrier element to a pipe element which is used for routing an air flow. The tube element in one embodiment of the invention is at least partially surrounded by at least one carrier element, i.e., the carrier element laterally surrounds the tube element. The openings on the two ends of the tube element are thus not covered by the carrier element. Suitable carrier elements can be, for example, cable ties or devices for snapping-in cables and hoses which are also referred to as clips or clip elements. If the carrier elements surround the tube element completely, for example along the periphery of the tube element, the coupling of the tube element to the pipe element is especially strong. This is also achieved in another embodiment of the invention by at least one carrier element and the tube element being materially joined to one another. This is effected preferably by injecting the carrier element onto the tube element.

The tube element can also be, in addition to a simple hose, a suction hose in which peripheral support elements ensure that the hose does not deform by the action of small forces to such a degree that it is closed. Stiffer elements, such as a flexible tube, for example of plastic, a corrugated hose or even a rigid tube are also conceivable.

The attachment of the tube element according to the invention for a water drain to a pipe element as is present in the form of an inlet or outlet tube in an air filter system can ensure with little effort that the tube element is guided and protected both during assembly and also during operation.

It is advantageous to use a tube element with a valve means. In this way the interior of the tube element can be used as a collecting region for the water which forms in the air filter.

Alternatively, a carrier element can be used not only for attaching the tube element, but also for fixing the tube element on the pipe element such that the tube element has an S-shaped segment or a loop. Thus, without using a valve, it is possible for the tube element to be closed against inflowing air by water which collects in the S-shaped segment or in the loop in the above described manner according to the siphon principle.

If the motor vehicle air filter system according to the invention is intended for a vehicle, the motor vehicle can be produced more efficiently with the same quality due to the enabled smooth assembly of the motor vehicle air filter system.

For this purpose primarily an assembly method with the following steps is advantageous:

a) attachment of the tube element to a pipe element with at least one carrier element, b) connection of the pipe element to the air filter of the motor vehicle and c1) simultaneous connection of the tube element to the air filter or c2) simultaneous alignment of the tube element into a predetermined position relative to the air filter and subsequent d2) connection of the tube element to the air filter.

By the tube element, i.e., for example a hose for water drainage, being attached to a pipe element which is to be mounted, such as, for example, an outlet tube of the air filter, the tube element is moved automatically into the position which has been predetermined for assembly of the tube element by placing the pipe element in the engine compartment and by connecting the pipe element to the motor vehicle air filter. The sole further required step is the connection of the tube element to the air filter. This further step can even be omitted when the tube element has sufficient stiffness so that when the pipe element is assembled, the tube element can be slipped onto the discharge of the air filter at the same time. A suitably formed soft seal between the tube element and the drain achieves a sealing action even when using very stiff tube elements.

DETAILED DESCRIPTION OF THE PREFERRED EMBODIMENT OF THE INVENTION

Figure 1:
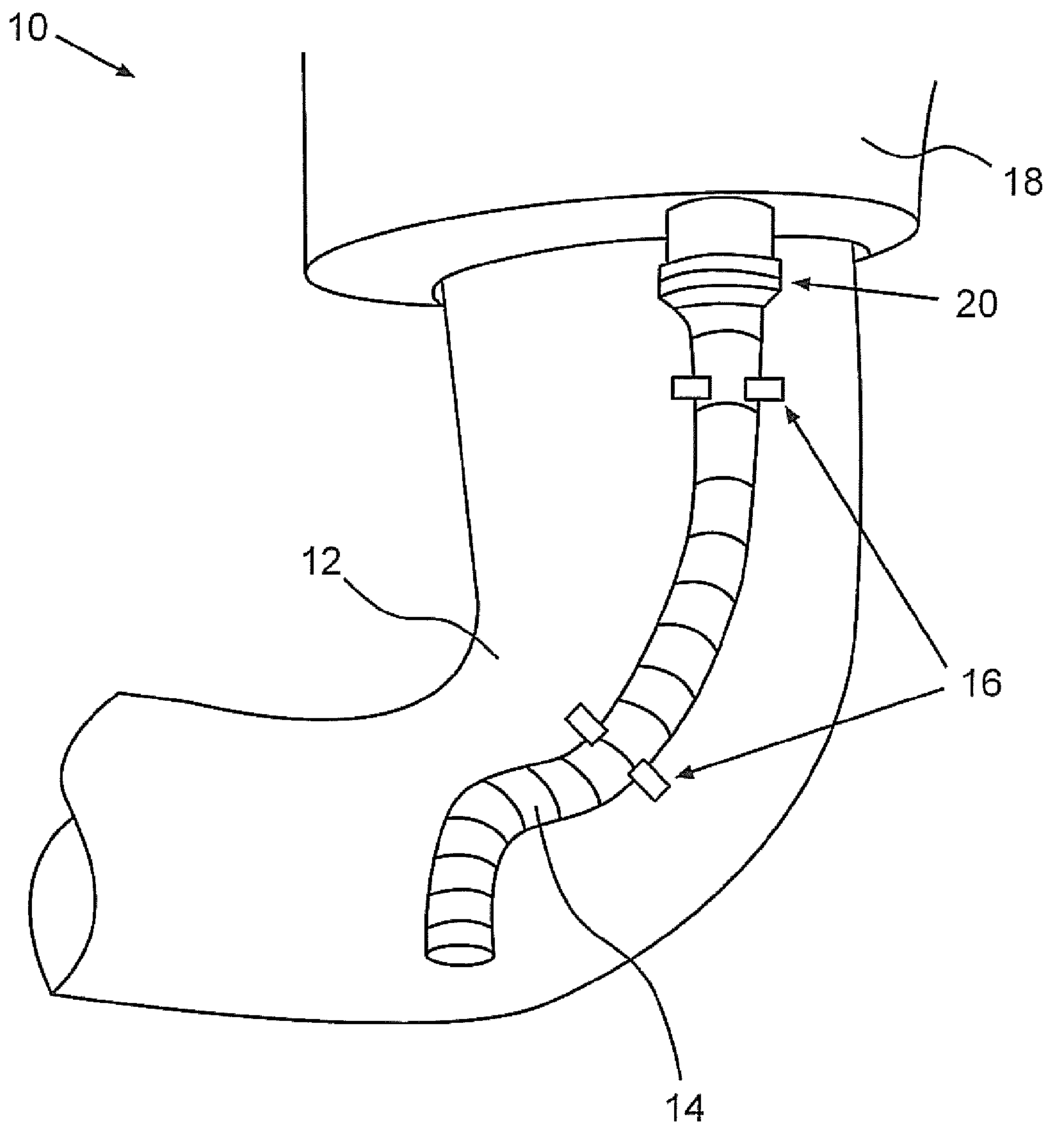
FIG. 1 shows a part of the motor vehicle air filter system according to the invention in a perspective and FIG. 2 shows another embodiment of the tube device according to the invention.

The motor vehicle air filter system 10 according to the invention which is shown in FIG. 1 has an outlet tube 12 for filtered air which consists of an inherently stiff material. A drain hose 14 which is used as a tube element for removing water is attached to the outlet tube 12. In the region of the end of the drain hose 14 which points down in the figure, in its interior there is a valve which is not shown in the figure for sealing the drain hose against the entry of air. Secure retention of the drain hose 14 on the outlet tube 12 is effected by two carrier elements 16. Each of the carrier elements has two extensions between which the drain hose 14 is snapped in. The outlet tube 12 is connected to an air filter 18 on the bottom of its housing. When the outlet tube 12 is connected to the air filter 18, the drain hose 14 which is attached to the outlet tube 12 is automatically aligned such as to enable smooth connection of the drain hose 14 to the drain 20 of the bottom of the housing of the air filter 18 which is provided for this purpose.

The drain hose 14 is routed along the outlet tube 12 and is positioned there both during assembly and also in operation in a defined manner in the installation space. Kinking and an incorrect position of the drain hose 14 in the space are thus prevented.

Figure 2:
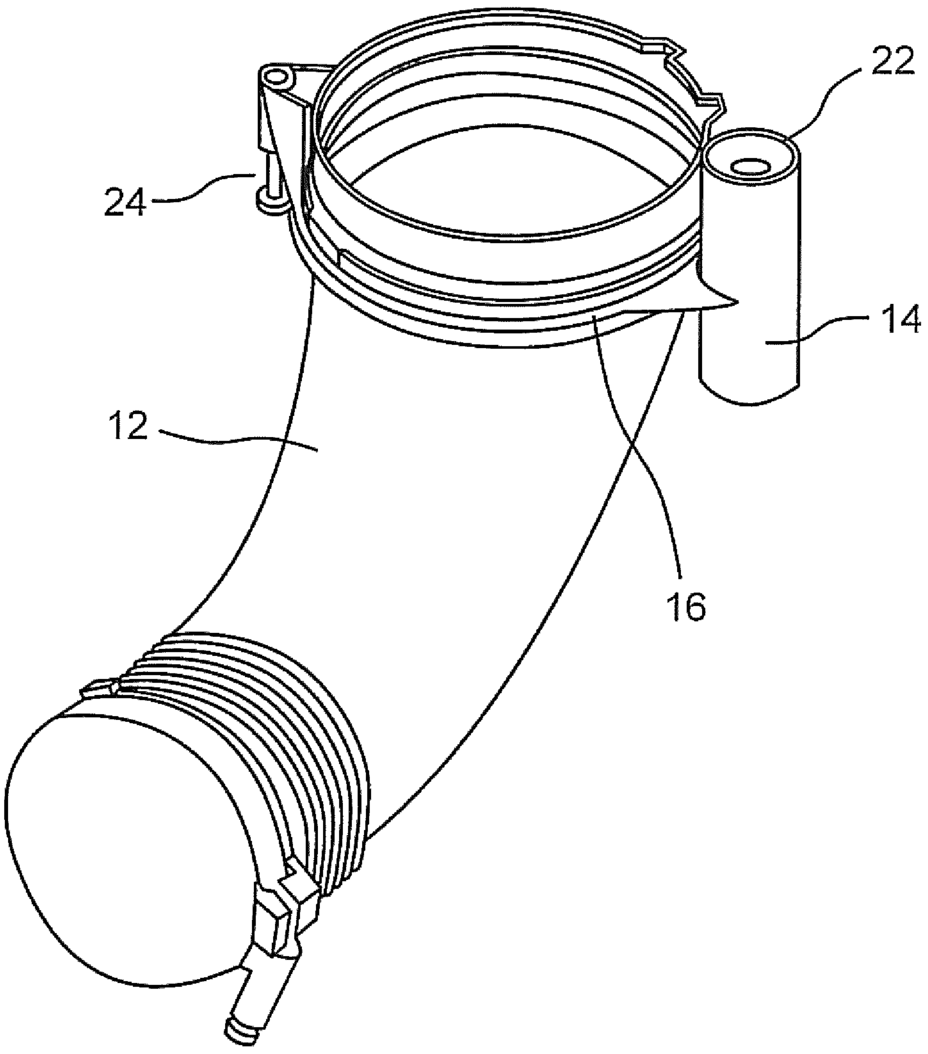

FIG. 2 shows a perspective of one embodiment of a tube device for the motor vehicle air filter system according to the invention. A drain tube 14 is connected to the outlet tube 12 by means of a retaining ring 16 which is used as the carrier element. The drain tube 14 is used to drain water from the air filter. The retaining ring 16 is injected onto the drain tube 14 here so that the retaining ring 16 and the drain tube 14 are materially joined to one another. On the opening which is intended for connection of the drain tube 14 to an air filter there is a seal 22 which makes it possible to slip the drain tube 14 onto the drain fitting of the air filter. The retaining ring 16 can likewise be fixed on the air filter using a screw 24.

The embodiments of the tube devices of the motor vehicle air filter system according to the invention which are shown in the two figures enable smooth assembly of the tube device on an air filter by the outlet tube 12 being connected to the air filter and thus the tube element 14 which is intended for discharging water being automatically aligned in the case of the embodiment shown in FIG. 1 into a predetermined position relative to the motor vehicle air filter 18 and, in the case of the embodiment shown in FIG. 2, the drain tube 14 being slipped directly onto the drain fitting at the same time.

The invention claimed is:

1. A device for draining liquid from the housing of an air filter of a motor vehicle, having an air outlet conduit and a liquid drain outlet comprising:

a drainage conduit disposed alongside said air outlet conduit having an inlet end connectable to said liquid drain outlet and an outlet end;

at least one carrier element disposed on said air outlet conduit, wherein the at least one carrier element releasably engages the drainage conduit and aligns one end of the drainage conduit with the liquid drain to allow the drainage conduit to be fluidically coupled to the liquid drain, thereby permitting the gravity flow of liquid therethrough; and means incorporated in said drainage conduit for conveying liquid therethrough while precluding the passage of a gas therethrough.

2. A device according to claim 1 wherein said drainage conduit comprises a rigid tube.

3. A device according to claim 1 wherein said drainage conduit comprises a flexible tube.

4. A device according to claim 1 wherein said at least one carrier element comprises at least one clip to which said conduit may be attached.

5. A device according to claim 1 wherein said means incorporated in said drainage conduit means comprises a one-way valve allowing the passage of liquid therethrough.

6. A device according to claim 1 wherein said means incorporated in said drainage conduit comprises said drainage having a first portion thereof bent in a first direction and a second portion thereof spaced from said second portion thereof, bent in a second direction opposite of said first direction, providing a section of said drainage conduit holding a body of liquid conducted therethrough forming a gas passage blockage.

7. A device according to claim 6 wherein said first, second and intermediate portions of said drainage conduit are provided with air s-shaped configuration.

8. A device according to claim 7 wherein said drainage conduit comprises a flexible tube and said supporting means is positioned on said air outlet conduit to impart an s-shaped configuration upon said tube being affixed thereto.

9. The device according to claim 1, wherein the device further comprises a seal, disposed on the drain tube 14 at a position where the drain tube is affixed to the air filter.

10. A method of providing the drainage of a liquid from an air filter of a motor vehicle, provided with a depending air outtake conduit and a liquid drainage outlet, while precluding the inlet of gas through said liquid drainage outlet, comprising:

providing a drainage tube disposed alongside said air outtake conduit having a first portion curved in a first direction, a second portion spaced from said first portion and curved in a direction opposite of said first direction;

attaching a first end of said tube to said liquid drainage outlet; and supporting said tube on said air outtake conduit in a manner that aligns one end of the drainage tube with said liquid drainage outlet, and that provides gravity flow of a liquid through said first and second portions of said drainage tube.

11. A device for draining liquid from the housing of an air filter of a motor vehicle, having an air outlet conduit and a liquid drain outlet comprising:

a drainage conduit disposed alongside said air outlet conduit having an inlet end connectable to said liquid drain outlet and an outlet end;

means for supporting said drainage conduit on said air outlet conduit, permitting the gravity flow of liquid therethrough; and means incorporated in said drainage conduit for conveying liquid therethrough while precluding the passage of a gas therethrough, wherein said supporting means comprises a retaining ring.

12. The device according to claim 11, wherein the retaining ring is fixed onto the air filter using a screw.

* * * * *